Figure 1:
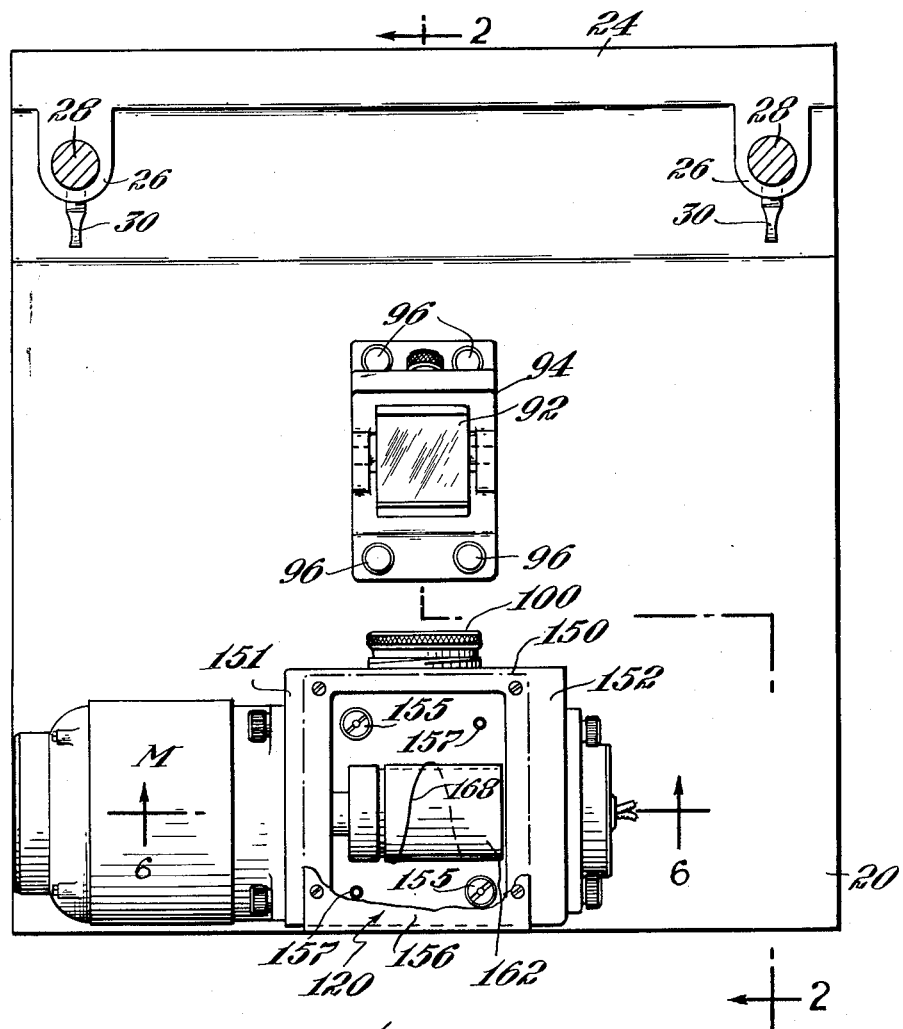

Jan. 22, 1957  A. NYMAN  2,778,872
OPTICAL SCANNER
Filed Sept. 28, 1951  5 Sheets-Sheet 1

Inventor
Alexander Nyman
by Roberts, Cushman & Grover
Att'ys.

Inventor
Alexander Nyman
by Roberts, Cushman & Grover
att'ys.

Jan. 22, 1957  A. NYMAN  2,778,872
OPTICAL SCANNER

Filed Sept. 28, 1951  5 Sheets-Sheet 3

Inventor
Alexander Nyman
by Roberts, Cushman + Grover
att'ys.

Jan. 22, 1957 A. NYMAN 2,778,872
OPTICAL SCANNER
Filed Sept. 28, 1951 5 Sheets-Sheet 4

Inventor
Alexander Nyman
by Roberts, Cushman & Grover
att'ys.

Jan. 22, 1957 A. NYMAN 2,778,872
OPTICAL SCANNER
Filed Sept. 28, 1951 5 Sheets-Sheet 5
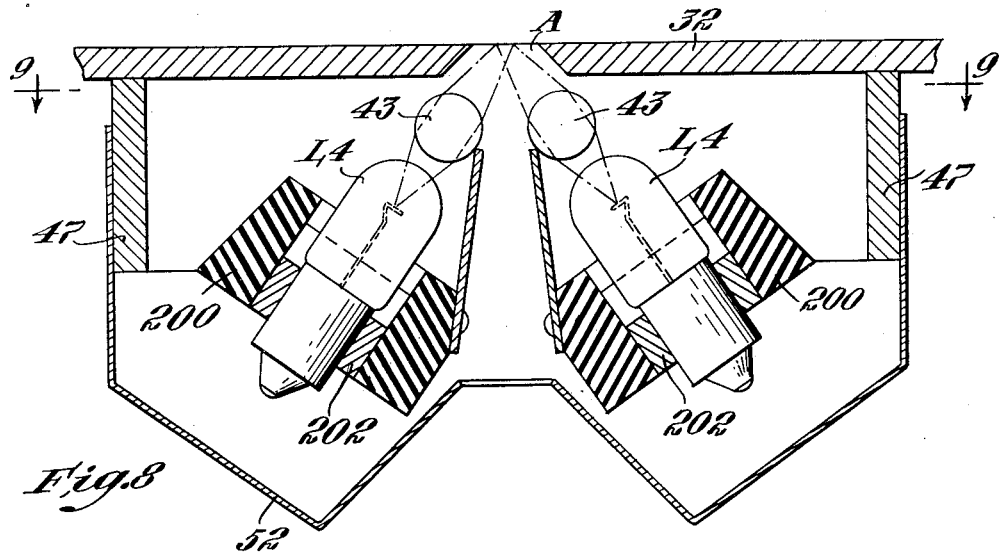
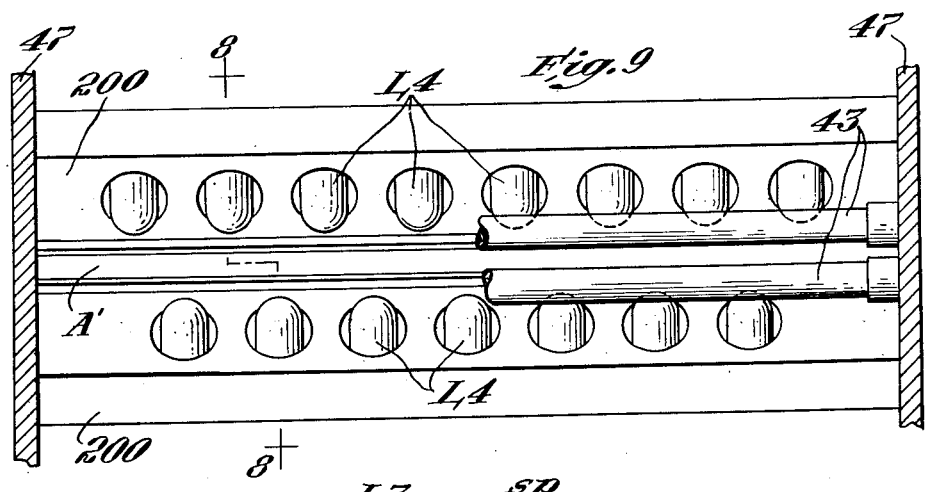
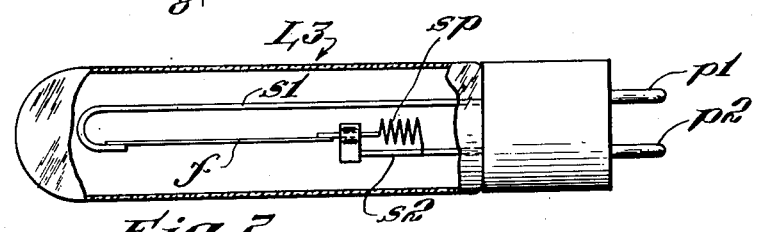
Inventor
Alexander Nyman
by Roberts, Cushman & Grover
Att'ys.

United States Patent Office 2,778,872
Patented Jan. 22, 1957

2,778,872
OPTICAL SCANNER

Alexander Nyman, Dover, Mass., assignor to Alden Products Co., Brockton, Mass., a corporation of Massachusetts Application September 28, 1951, Serial No. 248,713

4 Claims. (Cl. 178—7.1)

In conventional optical scanning apparatus, such as transmitters commonly used for facsimile and copy work, the subject copy is secured to the periphery of a rotating drum and scanned by a photoelectric cell which is moved axially relatively to the drum. This arrangement is very satisfactory for many applications but is subject to several inherent disadvantages including the necessity of stopping the drum to change the copy so that the transmission cannot be continuous. Furthermore the copy must be able to conform the surface of the drum thus making it impractical to scan nonflexible material such as bound books.

Objects of this invention are to provide an optical scanner which will scan flat copy, which does not require that the copy be deformed, which is continuous in operation, which does not require relative movement of the photocell transversely of the direction of feed to the copy, which is not limited as to the length of copy scanned, which does not require a complex optical system, which has a minimum of moving elements, which does not require synchronism of the moving elements, and which advances the art generally.

Optical scanning apparatus according to the present invention comprises feeding means, such as suitably power operated feed rolls, for moving a subject copy along a predetermined path defined for example, by the surface of a copy table having an elongated aperture or slot therethrough disposed transversely of the direction of movement of the copy. Illuminating means, such as a suitable light source and lens system, are provided for projecting upon the copy a band or strip of light having a substantially constant intensity throughout the entire length. Such length is as great as the length of the effective scanning line of the apparatus. The width of the band of light is maintained substantially constant and determines one dimension of the effective scanning spot. The band of light is disposed with its longitudinal axis transverse of the direction of movement of the copy so that the band can be directed by the lens system upon succeeding transverse elements of the moving copy. Light rays coming from the illuminated portion of the copy (either by transmission therethrough or reflection therefrom) are caused by means of a suitable optical system to impinge upon a light sensitive device such as a phototube, which is responsive to variations in light intensity. The optical system includes an aperture member such as a rotatable drum having a helically shaped light transmitting portion which is interposed in the optical path of the light rays between the copy and the light sensitive device so that the second dimension of the effective scanning spot is determined by the width of the light transmitting portion. Means such as an electrical motor are provided for rotating the aperture member about the axis of the helix so that the effective scanning spot sequentially traverses elements of the copy.

Figure 2:
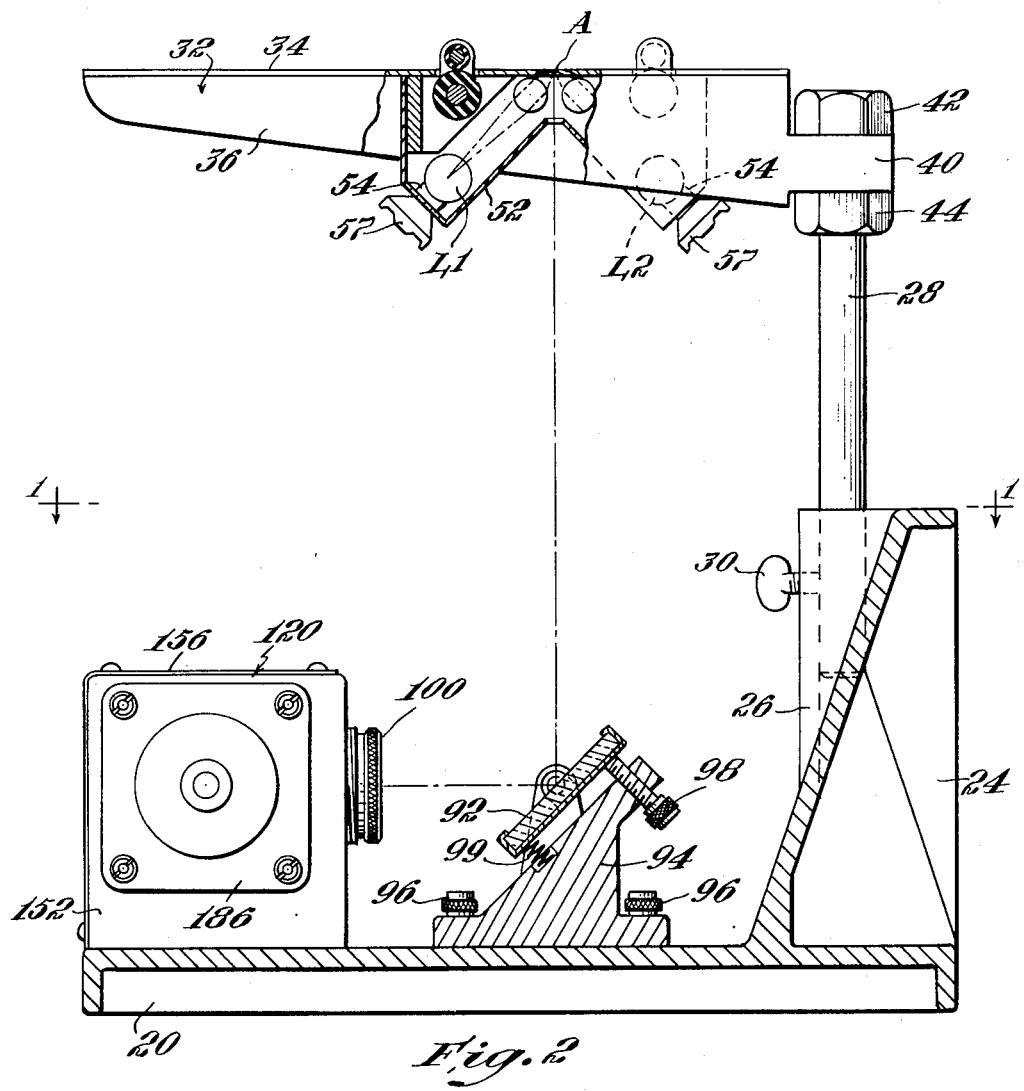
Figure 3:
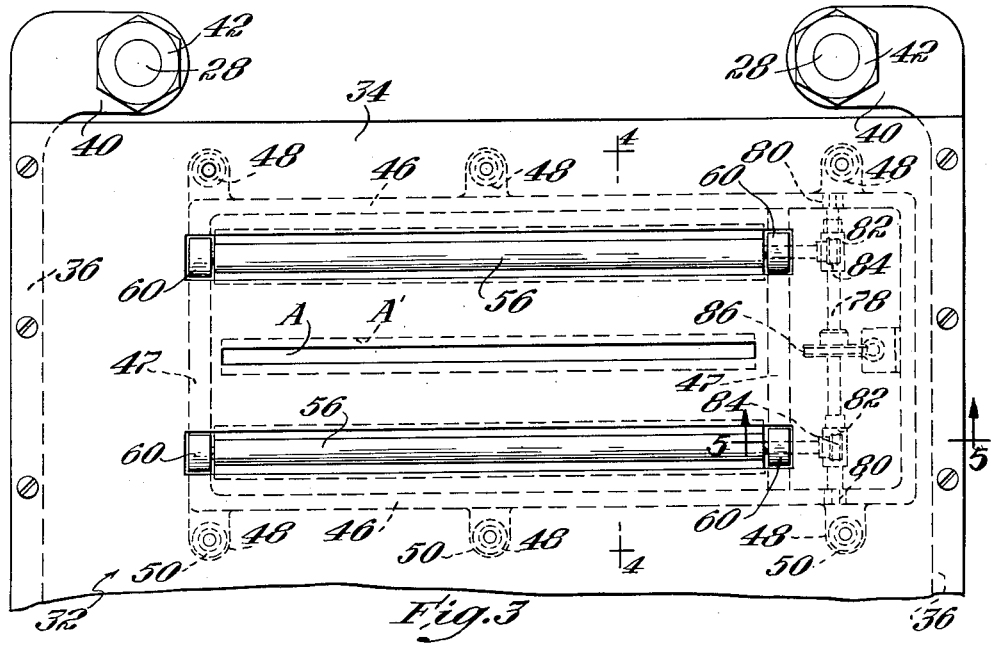
Figure 4:
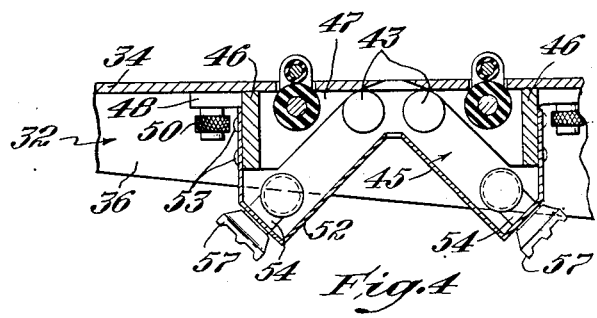
Figure 5:
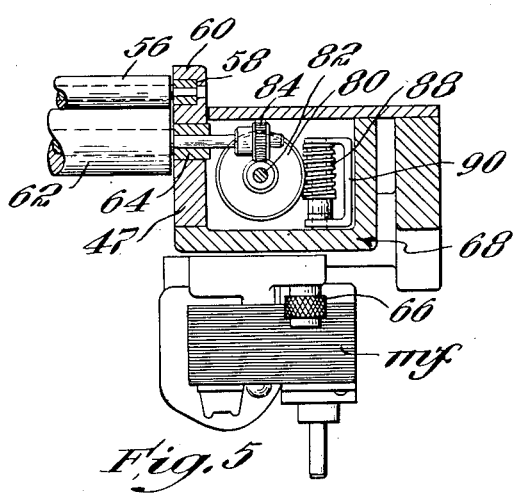
Figure 6:
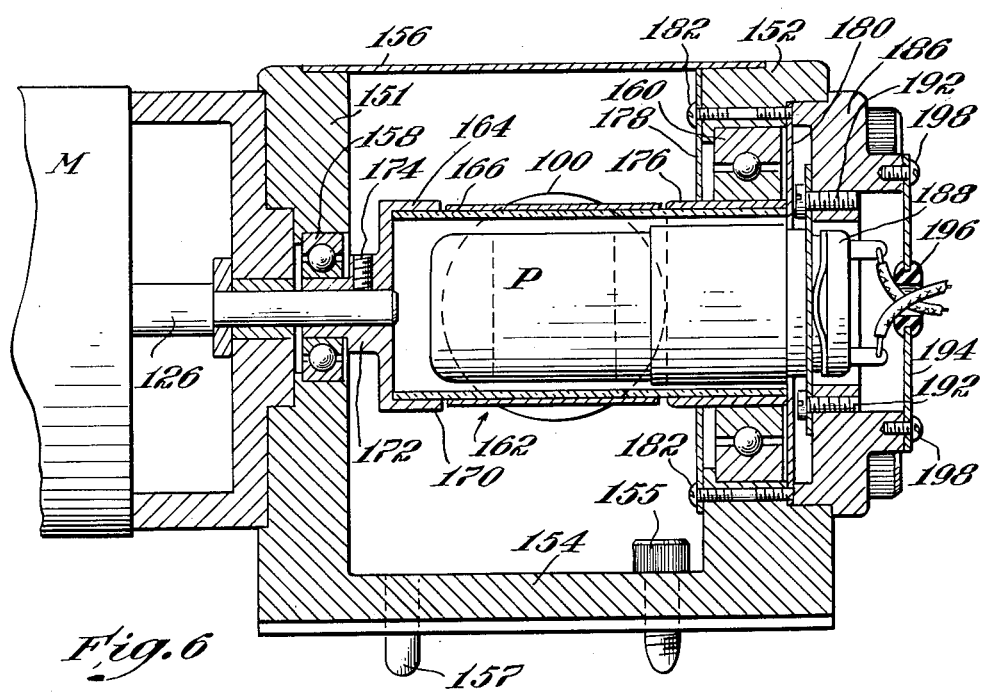
Figure 10:
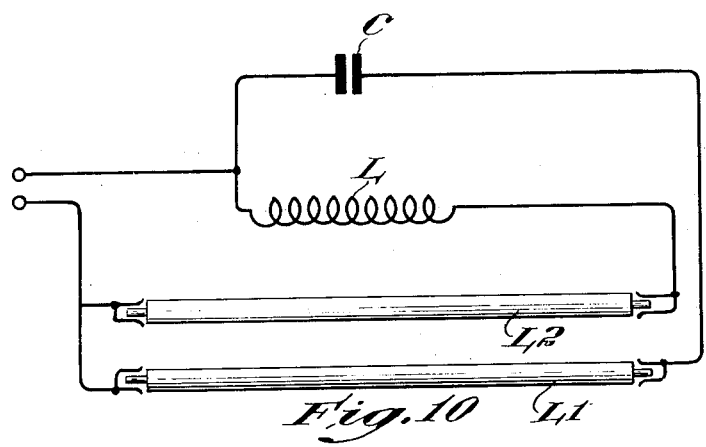

Other objects and aspects of the invention will be apparent from the following description of several specific embodiments of the invention referring to drawings wherein:

Fig. 1 is a plan view of the scanning apparatus with the copy table removed;
Fig. 2 is a sectional view on line 2—2 of Fig. 1;
Fig. 3 is a fragmentary plan view of the copy table;
Fig. 4 is a sectional view on line 4—4 of Fig. 3;
Fig. 5 is a sectional view on line 5—5 of Fig. 3;
Fig. 6 is a sectional view on line 6—6 of Fig. 1;
Fig. 7 is an elevation view with portions broken away of a special lamp for use with the scanning apparatus;
Fig. 8 is a sectional view of an alternate illuminating means;
Fig. 9 is a sectional view on line 9—9 of Fig. 8, and
Fig. 10 is a wiring diagram of a phase shifting circuit.

As is best shown in Figs. 1 and 2 the embodiment of the optical scanner chosen for the purposes of illustration is supported upon a base 20 having a bracket 24 cast integrally therewith so that the bracket extends upwardly from the rear of the base. The bracket 24 has bosses 26 positioned at either end thereof wherein are carried respectively two vertically disposed columns 28 which telescope in apertures in the bosses being secured in adjusted position by means of thumb screws 30.

Upon the upper ends of the columns 28 is carried a copy table 32 (Fig. 3), which has an upper copy guiding surface 34, each side of which is reinforced by a respective rib 36 being attached thereto by means of screws 38. At the rear end of each rib 36 is an integrally cast finger or tab 40 which is turned inwardly and provided with an aperture for engaging the upper end of a respective column 28. The table 32 is held in position by two pairs of nuts 42 and 44 which engage threads cut in the ends of the columns 28 so that nuts are positioned respectively above and below the tabs 40. As is best shown in Fig. 3, the surface 34 of the copy table 32 is provided with three transverse slots. The center slot A is brightly illuminated from the bottom of the table by a band of light from two tubular electric lamps L1 and L2 (Fig. 2) of the fluorescent type which are supported in respective sockets 54 attached to the bottom of each leg of the inverted V-shaped ends of a sheet metal enclosure 52 for a lamp housing 45. Near the apex of the legs of the housing ends are supported two cylindrical lenses 43 of a material having a high index of refraction, such as methyl methacrylate, which are proportioned to concentrate the rays from the respective lamps L1 and L2 into two elongated strips or bands of light which coincide at the aperture A and have a length at least as great as the width of the subject copy to be scanned. The width of the bands of light as determined by the cylindrical lenses 43 is approximately 0.010 inch.

The sheet metal enclosure 52 is attached by means of screws 53 (Fig. 4) to two opposed side frame members 46 whose corresponding ends are joined respectively by the connecting members 47 to form the substantially rectangular lamp housing 45. The side members 46 have formed integrally therewith a plurality of tabs 48 which are provided with aperture for receiving respective knurl headed screws 50 whose shanks engage threaded apertures in the bottom of the copy table 32 thereby to secure the housing to the table. Suitable electrical connectors 57 of conventional design are located at the lower end of each of the legs of the V-shaped enclosure 52 for connecting the lamps L to a phase shifting power supply circuit for the lamps L1 and L2 which will be described in detail hereinafter. A slotted aperture A' is positioned at the apex of the enclosed legs where it is in vertical alignment with the table aperture A so that the copy exposed at the slot A is visible from below for reasons which will appear hereinafter.

The lamp housing 45 also supports two pairs of copy feed rolls which are located in the outer slots in the table on either side of the aperture A. The upper driven roll 56 is carried upon a shaft which is journaled in bearings 58 as is shown in Fig. 5. Each bearing 58 is pressed into an aperture in a respective boss 60 which projects upwardly through the slotted apertures in the table from the connecting members 47 of the lamp housing 45. The shaft of the lower driving roll 62 is journaled in bearings 64 pressed in apertures in the opposed connecting members 47 immediately below the bosses 60.

Both pair of feed rolls are driven at the same speed by means of an electric motor Mf which is suspended from the bottom of the housing 68 of a reduction gear unit by means of the knurled screws 66. The gear reduction unit comprises a shaft 78 whose ends are journaled in bearings 80 (Fig. 3) pressed in the housing ends 70. The shaft 78 carries two worms 82 which engage gears 84 carried on the ends of the respective shafts of the lower feed rolls 62. Interposed between the worms 82 is a driving gear 86 which mates with a worm gear 88 carried upon the shaft of the motor M between the arms of a V-shaped bracket 90 secured to the side wall of the gear reduction unit housing 68.

As the sheet of subject copy is moved by the illuminated aperture A as described above, the image thereof is reflected by a stationary mirror 92 (Figs. 1 and 2) pivotally mounted in a bracket 94 which is attached to the base 20 by means of cap screws 96. The relative position of the mirror is adjustable by means of a screw 98, which operates against the biasing force exerted by a spring 99 so that light rays from the illuminated element of the copy are directed through a converging lens system 100 mounted in the back wall of a housing 120.

The details of construction of the housing 120 and the manner in which a light sensitive device such as the phototube P is mounted therein are best shown in Figs. 1 and 6. The rear wall 150 wherein is mounted the barrel of the lens system 100, the side wall 151 supporting the motor M as mentioned above, the opposite side wall 152 and the bottom portion 154 of the housing 120 are cast integrally at right angles to one another thereby to form a substantially cubical structure having an open top and front wall which can be closed by a cover plate 156 to exclude any light. The housing 120 is attached to the base 20 by means of cap screws 155 which extend through the bottom portion 154, the housing position being definitely established by two dowels 157.

The walls 151 and 154 are provided with axially alined apertures wherein are seated respectively two ball bearings 158 and 160 (Fig. 6) which journal an aperture drum 162. This drum comprises a cylinder 164 of transparent material such as glass or a suitable plastic. Cemented or otherwise secured to the outer periphery of the drum 162 is a sheet 166 of opaque material such as an exposed photographic film whereupon there has been developed a light transmitting helical aperture 168 (Fig. 1). One end of the cylinder 162 is closed by a head 170 having a stub shaft 172 which engages the inner race of the bearing 158. The shaft 172 is provided with an aperture for receiving the end of the shaft 126 of the motor M, relative rotation between the shafts being prevented by a set screw 174. The opposite end of the cylinder 162 is surrounded by ferrule 176 which engages the inner race of the bearing 160. On either side of the bearing 160 are provided shields such as 178 and 180 which are held in place by screws 182.

The phototube P is mounted within the drum 162 so that it can be removed without disturbing the drum assembly or bearings. To this end an end plate 186 carrying a socket 188 for the phototube P engages a rabbet cut in the housing side wall 152 being secured therein by screws 190. The socket 188 is secured in an aperture in the end plate 186 by means of screws 192, the aperture being closed by a cover 194 having a grommet 196 therein out through which are brought the leads coming from the socket 188. The cover 194 is attached to the end plate 186 by means of screws 198.

To overcome the stroboscopic effect resulting when the fluorescent lamps L1 and L2 are energized from an alternating power source it has been found advantageous to use a phase shifting circuit such as is shown in Fig. 10 so that the electric currents through the respective lamps L1 and L2 are substantially ninety degrees out of phase. The phase shifting circuit comprises a capacitor c connected in series with the lamp L1 and an inductor L connected in series with the lamp L2, the capacitor and inductor having reactive values great enough to cause the current through the lamp L1 to lead the current through the lamp L2 by approximately 90° so that substantially flickerless illumination of the element of the copy exposed in the slot A can be obtained. The lamps L1 and L2 are started by means of conventional glow starters (not shown) or by a transient high voltage supplied for example by means of a starting element having a saturable core.

It is also possible to secure better definition of line illumination by use of a special incandescent lamp L3 such as shown in Fig. 7. The lamp L3 is provided with an elongated filament f one end of which is fastened to a U-shaped support s1 which is connected with one of the connecting pins p1 in the lamp base. The other end of the filament is secured by a tensioning spring sp and guided by a second support s2 which is connected to the pin p2. The elongated filament f1 is used to provide a band of light which is of substantially constant intensity throughout its entire length. Incandescent lamps such as L3 described above can be installed in place of the fluorescent lamps L1 and L2 without alteration other than change of the type of socket and condensing lens 43 and elimination of the auxiliary circuit components used with the fluorescent lamps. If a direct current source is used to energize the lamps, the phase shifting elements can also be eliminated.

A plurality of small incandescent lamps L4 can also be used. These are preferably arranged in two banks as is shown in Figs. 8 and 9, the lamps in the respective banks being arranged so that each lamp is opposite the interstices between adjacent lamps in the opposite bank. Each bank consists of a nonconducting block 200, molded for example of a suitable plastic, wherein is provided a row of apertures each having a split metal insert 202 that acts as a socket for receiving a respective lamp. The lamps L4 may be connected in either parallel or series by a plurality of short leads or pigtails (not shown) the ends of which are soldered to the inserts and the central contact terminals of the lamps. The blocks 200 are fastened to the ends of the enclosing sheet metal enclosure 52 so that the filaments of the lamps L4 in the respective banks lie in planes which pass through the axes of the associated cylindrical lens and coincide at the plane of the top of the copy table 32. The action of the cylindrical lens 43 and the staggering of the lamps L4 results in a band of light of substantially constant intensity throughout its length being projected upon the element of the subject copy exposed by the aperture A. With lamps staggered as described above, it has been found preferable to avoid a stroboscopic effect to use a direct current power source.

The operation of the above described scanning apparatus is essentially very simple. The subject copy is placed upon the top of the table 32 and inserted so that it is fed between two pairs of rolls 56 and 62 with the surface to be scanned lying upon the table surface 34. Upon energization, the motor Mf conjointly operates both pair of feed rolls, as described heretofore, so that the copy moves by the slotted aperture A in the table surface 34.

As is best shown in Fig. 2 light rays reflected from the illuminated line are imaged by the stationary mirror 140 through the lens system 100 into the interior of the phototube housing 120, and are focused on the surface of the aperture drum 162 which is positioned immediately behind the lens system. The image of the line upon the surface of the drum is in a horizontal plane through the axis of rotation of the drum.

It will be evident that if the drum assembly 162 is not rotating, a spot of light will impinge upon the phototube P, one of whose dimensions is determined by the width of the band of light projected upon the transverse element of the copy by any one of the above described illuminating means. The other dimension of the spot of light is determined by the width of the light transmitting portion 168 upon the periphery of the drum assembly 162. It will be further evident that as the drum assembly 162 is rotated about the axis of the helix by means of the motor M, the result is the same as if a spot of light traversed the effective length of the helix during each revolution of drum exposing succeeding elemental areas of the illuminated element of the subject copy of the phototube P. By correlating the speed of the feed roll motor M$f$ with that of the drum motor M it is possible to move successive elements of the copy into the illuminated area upon each revolution of the drum so that the light spot in effect traverses succeeding elemental areas of sequential transverse elements of the subject copy i. e. the copy is scanned.

It should be understood that the present disclosure is for the purpose of illustration only and that this invention includes all modifications and equivalents which fall within the scope of the appended claims.

I claim:

1. Facsimile apparatus for scanning successive subject copy areas of elemental width and length comprising a light source, first optical means between said source and copy for focusing an elongate illuminating line of elemental width directly on the copy, said optical means being the sole means of defining said width, light utilization means, scanning means providing a scanning aperture between the copy and said utilization means, said scanning means being effectively movable lengthwise of said illuminating line and said aperture being of width to define the length of said elemental area, means for moving said scanning means, and second optical means focusing an image of the illuminated line of copy on the moving aperture, whereby the two respective dimensions of successive elemental areas of said copy are separately defined, one in said scanning plane and one at said aperture so as to allow sharp focusing of both dimensions independently.

2. Apparatus according to claim 1 wherein said scanning means is a drum enclosing said utilization means and said light source is outside and masked from said drum.

3. Apparatus according to claim 1 wherein said first optical means comprises means for illuminating substantially the whole width of the copy.

4. Apparatus for scanning successive two dimensional, elemental areas of subject copy comprising a support for said copy defining a scanning plane, a light source, means focusing an elongate image of said source in said scanning plane thereby to illuminate an elongate area of said copy including means limiting the width of said image to the corresponding dimension of an elemental area, said limiting means being the sole means of defining said width, light utilization means, optical means for projecting light from said illuminated area on said utilization means, scanning means between said illuminated area and utilization means forming an aperture effectively movable parallel to said illuminated area and means for moving said scanning means, said optical means imaging said illuminated area on said movable aperture, and said aperture being of width to limit the length of the imaged area to the other corresponding dimension of an elemental area, whereby the two respective dimensions of successive elemental areas of said copy are separately defined, one in said scanning plane and one at said aperture, so as to allow sharp focusing of both dimensions independently.

References Cited in the file of this patent

UNITED STATES PATENTS

| Number | Name | Date |
|---|---|---|
| 1,828,000 | Ranger | Oct. 20, 1931 |
| 1,958,996 | Hansen et al. | May 15, 1934 |
| 2,110,945 | Walton | Mar. 15, 1938 |
| 2,146,905 | McLeod et al. | Feb. 14, 1939 |
| 2,379,906 | Hogan | July 10, 1945 |
| 2,405,518 | Polevitzky | Aug. 6, 1946 |
| 2,510,200 | Thompson | June 6, 1950 |
| 2,578,307 | Hunt | Dec. 11, 1951 |